(12) United States Patent
Cui (10) Patent No.: US 12,075,129 B2
(45) Date of Patent: Aug. 27, 2024

(54) METHOD, APPARATUS, MEDIUM AND ELECTRONIC DEVICE FOR CONFIGURING A GIFT LIST IN A LIVE BROADCAST ROOM

(71) Applicant: BEIJING BYTEDANCE NETWORK TECHNOLOGY CO., LTD., Beijing (CN)

(72) Inventor: Jin Cui, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 122 days.

(21) Appl. No.: 17/787,357

(22) PCT Filed: Nov. 9, 2020

(86) PCT No.: PCT/CN2020/127582
§ 371 (c)(1),
(2) Date: Jun. 20, 2022

(87) PCT Pub. No.: WO2021/135648
PCT Pub. Date: Jul. 8, 2021

(65) Prior Publication Data
US 2023/0015800 A1    Jan. 19, 2023

(30) Foreign Application Priority Data
Jan. 2, 2020    (CN) .......................... 202010001888.6

(51) Int. Cl.
*H04N 21/4788*    (2011.01)
*H04L 12/18*    (2006.01)

(52) U.S. Cl.
CPC ......... *H04N 21/4788* (2013.01); *H04L 12/18* (2013.01); *H04L 12/1813* (2013.01)

(58) Field of Classification Search
CPC .. H04N 21/4788; H04L 12/18; H04L 12/1813
See application file for complete search history.

(56) References Cited

U.S. PATENT DOCUMENTS

| 11,720,949 B2 * | 8/2023 | Wang .................... H04L 65/611 |
| | | 705/26.7 |
| 2013/0073421 A1 | 3/2013 | Poisson |

(Continued)

FOREIGN PATENT DOCUMENTS

| CN | 1510612 A | 7/2004 |
| CN | 105959127 A | 9/2016 |

(Continued)

OTHER PUBLICATIONS

Search Report mailed Feb. 3, 2021 in PCT Application No. PCT/CN2020/127582 with English translation (13 pages).

(Continued)

*Primary Examiner* — Bryan Y Lee (57) ABSTRACT

The present disclosure relates to a method, apparatus, medium and electronic device for configuring a gift list in a live broadcast room, comprising: receiving a gift list request sent by a client terminal, the gift list request including a room number of a live broadcast room where a user logging into the client terminal is located; determining a region where a host in the live broadcast room is located when broadcasting according to the room number of the live broadcast room; determining targeting gift list information corresponding to the region; and sending the targeting gift list information to the client terminal in response to the gift list request.

15 Claims, 7 Drawing Sheets

(56) References Cited

U.S. PATENT DOCUMENTS

| | | | | |
|---|---|---|---|---|
| 2016/0057457 A1* | 2/2016 | Clements | ........... | H04N 21/4882 |
| | | | | 725/109 |
| 2019/0190970 A1 | 6/2019 | Systrom et al. | | |
| 2020/0143447 A1* | 5/2020 | Wang | ................. | G06Q 30/0212 |
| 2022/0303605 A1* | 9/2022 | Zhang | ................ | H04N 21/6587 |

FOREIGN PATENT DOCUMENTS

| | | | | |
|---|---|---|---|---|
| CN | 106411877 | A | | 2/2017 |
| CN | 106487781 | A | | 3/2017 |
| CN | 106792081 | A | | 5/2017 |
| CN | 106873971 | A | | 6/2017 |
| CN | 106993233 | A | | 7/2017 |
| CN | 107040822 | A | | 8/2017 |
| CN | 107371054 | A | | 11/2017 |
| CN | 107493514 | A | | 12/2017 |
| CN | 108712672 | A | | 10/2018 |
| CN | 109743588 | A | * | 5/2019 |
| CN | 110278464 | A | | 9/2019 |
| CN | 110536149 | A | | 12/2019 |
| CN | 111163329 | A | | 5/2020 |

OTHER PUBLICATIONS

First Office Action mailed Dec. 2, 2020 in CN Application No. 202010001888.6 with English translation of claim 1 (14 pages).
Second Office Action mailed Feb. 19, 2021 in CN Application No. 202010001888.6 with English translation of claim 1 (14 pages).
Third Office Action mailed Jun. 9, 2021 in CN Application No. 202010001888.6 with English translation of claim 1 (7 pages).

* cited by examiner

METHOD, APPARATUS, MEDIUM AND ELECTRONIC DEVICE FOR CONFIGURING A GIFT LIST IN A LIVE BROADCAST ROOM

CROSS-REFERENCE TO RELATED APPLICATIONS

This application is a National Stage of International Application No. PCT/CN2020/127582, filed Nov. 9, 2020, and this disclosure claims the priority of the Chinese patent application titled "A METHOD, APPARATUS, MEDIUM AND ELECTRONIC DEVICE FOR CONFIGURING A GIFT LIST IN A LIVE BROADCAST ROOM", with the Application Number 202010001888.6, filed to the China Patent Office on Jan. 2, 2020, the entire contents of which are approved by References are incorporated in this disclosure.

TECHNICAL FIELD

The present disclosure relates to the field of networks, and more particularly, to a method, apparatus, medium and electronic device for configuring a gift list in a live broadcast room.

BACKGROUND

In the prior art, a viewer may perform a gift-giving operation in a live broadcast room, wherein gift information that can be displayed by all client terminals in the same platform is substantially unified, and gift lists in the client terminals are consistent with a gift list configured on a server.

SUMMARY

The purpose of the present disclosure is to provide a method, apparatus, medium and electronic device for configuring a gift list in a live broadcast room. Targeting gift list information to be sent to a client terminal can be determined through different broadcast regions of hosts, and different gift lists can be customized for different regions separately, so that gift lists that can be seen in live broadcast rooms where hosts broadcasting indifferent regions are located can vary.

According to some embodiments of the present disclosure, in a first aspect, the present disclosure provides a method for configuring a gift list in a live broadcast room, which is applied to a server, comprising:

receiving a gift list request sent by a client terminal, the gift list request including a room number of a live broadcast room where a user logging into the client terminal is located;

determining a region where a host in the live broadcast room is located when broadcasting according to the room number of the live broadcast room;

determining targeting gift list information corresponding to the region; and sending the targeting gift list information to the client terminal in response to the gift list request.

Based on above technical content, after receiving a gift list request sent by a client terminal, it is possible to determine, according to room number information of a live broadcast room where a user logging into the client terminal is located, which is included in the request, a broadcast region of a host in the live broadcast room watched by the logged-in user in the client terminal, so that targeting gift list information to be sent to the client terminal can be determined according to different broadcast region of the host. In this way, different gift lists can be customized for different regions, so that gift lists that can be seen in live broadcast rooms where hosts broadcasting in different regions are located can vary.

In one implementation, the determining the targeting gift list information corresponding to the region includes:

updating display state corresponding to each gift in the preset gift list information according to the region; and using the updated preset gift list information as the targeting gift list information.

Further, by sending the updated preset gift list information to the client terminal as the targeting gift list information, so as to indicate the client terminal to display gifts in the gift list in the live broadcast room.

In one implementation, the method further comprises:

acquiring a first gift language profile for language configuration of each gift in the targeting gift list information, the first gift language profile including configuration information of a plurality of languages corresponding to the gifts;

the sending the targeting gift list information to the client terminal including:

sending the targeting gift list information and the first gift language profile to the client terminal.

Further, by sending the first gift language profile including the configuration information of a plurality of languages to the client terminal together with the targeting gift list information, so that the client terminal can select appropriate language configuration information from the first gift language profile to perform language configuration of the displayed gifts in the gift list according to its own needs or settings thereof.

In one implementation, the gift list request further includes a language preference set in the client terminal, and the method further comprises:

acquiring a second gift language profile for language configuration of each gift in the targeting gift list information according to the language preference;

the sending the targeting gift list information to the client terminal including:

sending the targeting gift list information and the second gift language profile to the client terminal.

Further, language configuration is directly performed on the gifts displayed in the gift list in the live broadcast room according to the second gift profile, without the need to select and configure from the configuration information of the plurality of languages locally on the client terminal.

In a second aspect, the present disclosure further provides a method for configuring a gift list in a live broadcast room, which is applied to a client terminal, the method comprising:

in a case that a triggering condition for sending a gift list request to a server is triggered, sending the gift list request to the server, the gift list request including a room number of the live broadcast room where a user logging into the client terminal is located;

receiving targeting gift list information fed back by the server in response to the gift list request, the targeting gift list information corresponding to a region where a host in the live broadcast room is located when broadcasting; and displaying gifts according to the targeting gift list information.

In combination with above technical solutions, after receiving a gift list request sent by a client terminal, it is possible to determine, according to room number information of a live broadcast room where a user logging into the client terminal is located, which is included in the request, a broadcast region of a host in the live broadcast room watched by the logged-in user in the client terminal, so that targeting gift list information to be sent to the client terminal can be determined according to different broadcast region of the host. In this way, different gift lists can be customized for different regions, so that gift lists that can be seen in live broadcast rooms where hosts broadcasting in different regions are located can vary.

In one implementation, the displaying gifts according to the targeting gift list information including:

displaying gifts according to display state corresponding to each gift in the targeting gift list information.

Further, indicating which gifts need to be displayed and which gifts do not need to be displayed according to display state corresponding to each gift.

In one implementation, the displaying gifts according to the targeting gift list information includes: displaying gifts according to display state corresponding to each gift in the targeting gift list information.

Further, in a case that when indicating which gifts need to be displayed and which gifts do not need to be displayed according to the displayed gifts, displaying gifts according to gifts shown in the targeting gift list information directly.

In one implementation, the receiving the targeting gift list information fed back by the server in response to the gift list request includes:

receiving the targeting gift list information and a first gift language profile for language configuration of each gift in the targeting gift list information, the first gift language profile including configuration information of a plurality of languages corresponding to the gifts;

the displaying gifts according to the targeting gift list information further including:

displaying gifts according to a language preference set in the client terminal, the first gift language profile and the targeting gift list information.

Further, corresponding language configuration information is selected from the first gift language profile according to the language preference set in the current client terminal, so that the language when gifts are displayed in the gift list in the live broadcast room can be the same as that set in the client terminal.

In one implementation, the gift list request further includes a language preference set in the client terminal, and the receiving the targeting gift list information fed back by the server in response to the gift list request includes:

receiving the targeting gift list information and a second gift language profile, the second gift language profile including language configuration information corresponding to each gift in the targeting gift list information and the language preference;

the displaying gifts according to the targeting gift list information further including:

displaying gifts according to the second gift language profile and the targeting gift list information.

Further, when sending the gift list request to the server, the language preference is also sent to the server, and then respective language configuration can be made to displayed gifts directly according to the second gift language profile fed back by the server. In the second gift language profile, there is the language configuration information corresponding to the language preference for language configuration of the gifts.

In a third aspect, the present disclosure further provides an apparatus for configuring a gift list in a live broadcast room, which is applied to a server, the apparatus comprising:

a first receiving module used to receive a gift list request sent by a client terminal, the gift list request including a room number of a live broadcast room where a user logging into the client terminal is located;

a first processing module used to determine a region where a host in the live broadcast room is located when broadcasting, according to the room number of the live broadcast room;

a second processing module used to determine targeting gift list information corresponding to the region; and a first sending module used to send the targeting gift list information to the client terminal in response to the gift list request.

In a fourth aspect, the present disclosure further provides an apparatus for configuring a gift list in a live broadcast room, which is applied to a client terminal, the apparatus comprising:

a second sending module used to, in a case that a triggering condition for sending a gift list request to a server is triggered, sending the gift list request to the server, the gift list request including a room number of the live broadcast room where a user logging into the client terminal is located;

a second receiving module used to receive targeting gift list information fed back by the server in response to the gift list request, the targeting gift list information corresponding to a region where a host in the live broadcast room is located when broadcasting; and a displaying module used to display gifts according to the targeting gift list information.

In a fifth aspect, the present disclosure further provides a computer-readable medium having a computer program stored thereon, which, when executed by a processing apparatus, implements the steps of the method as in the first aspect above.

In a sixth aspect, the present disclosure further provides an electronic device, comprising:

a storage apparatus having a computer program stored thereon; and a processing apparatus used to execute the computer program in the storage apparatus to implement the steps of the method in the first aspect.

In a seventh aspect, the present disclosure further provides a computer-readable medium having a computer program stored thereon, which, when executed by a processing apparatus, implements the steps of the method as in the second aspect.

In an eighth aspect, the present disclosure further provides an electronic device, comprising:

a storage apparatus having a computer program stored thereon; and a processing apparatus used to execute the computer program in the storage apparatus to implement the steps of the method in the second aspect.

In a ninth aspect, the present disclosure further provides a computer program comprising program code, when a computer runs the computer program, the program code executes the method according to the first aspect.

In a tenth aspect, the present disclosure further provides a computer program comprising program code, when a computer runs the computer program, the program code executes the method according to the second aspect.

In combination with above technical solutions, after receiving a gift list request sent by a client terminal, it is possible to determine, according to room number information of a live broadcast room where a user logging into the client terminal is located, which is included in the request, a broadcast region of a host in the live broadcast room watched by the logged-in user in the client terminal, so that targeting gift list information to be sent to the client terminal can be determined according to different broadcast region of the host. In this way, different gift lists can be customized for different regions, so that gift lists that can be seen in live broadcast rooms where hosts broadcasting in different regions are located can vary. By sending the updated preset gift list information to the client terminal as the targeting gift list information, so as to indicate the client terminal to display gifts in the gift list in the live broadcast room. By sending the first gift language profile including the configuration information of a plurality of languages to the client terminal together with the targeting gift list information, so that the client terminal can select appropriate language configuration information from the first gift language profile to perform language configuration of the displayed gifts in the gift list according to its own needs or settings thereof. Language configuration is directly performed on the gifts displayed in the gift list in the live broadcast room according to the second gift profile, without the need to select and configure from the configuration information of the plurality of languages locally on the client terminal.

BRIEF DESCRIPTION OF THE DRAWINGS

The above and other features, advantages, and aspects of embodiments of the present disclosure will become more apparent in conjunction with the accompanying drawings and with reference to the following detailed description. Throughout the drawings, the like or similar reference signs indicate the like or similar elements. It should be understood that the drawings are schematic and the originals and elements are not necessarily drawn to scale. In the drawings.

DETAILED DESCRIPTION

Hereinafter, embodiments of the present disclosure will be described in more detail with reference to the accompanying drawings. Although some embodiments of the present disclosure are shown in the drawings, it should be understood that the present disclosure can be implemented in many different forms, which should not be construed as being limited to embodiments set forth herein, rather, these embodiments are provided for a more thorough and complete understanding of the present disclosure. It should be understood that the drawings and embodiments of the present disclosure should be explained as merely illustrative, and not as a limitation to the protection scope of the present disclosure.

It should be understood that various steps recited in the method embodiments of the present disclosure can be executed in a different order, and/or executed in parallel. In addition, the method implementations may include additional steps and/or omit to perform illustrated steps. The scope of the present disclosure is not limited in this respect.

The term "including" and its variants as used herein are open includes, that is, "including but not limited to". The term "based on" means "based at least in part on." The term "one embodiment" means "at least one embodiment"; the term "another embodiment" means "at least one additional embodiment"; the term "some embodiments" means "at least some embodiments." Related definitions of other terms will be given in following description.

It should be noted that the concepts of "first" and "second" etc. mentioned in the present disclosure are only used to distinguish between different apparatus, modules or units, and are not used to limit the order of functions performed by these apparatus, modules or units or their interdependence.

It should be noted that modifiers of "one" and "a plurality of" mentioned in the present disclosure are illustrative and not restrictive, and those skilled in the art should understand that they should be construed as "one or more" unless the context clearly indicates otherwise.

The names of messages or information interacted between a plurality of apparatus in the embodiments of the present disclosure are only used for illustration, and are not used to limit the scope of these messages or information.

In the prior art, a viewer may perform a gift-giving operation in a live broadcast room, wherein gift information that can be displayed by all client terminals in the same platform is substantially unified, and gift lists in the client terminals are consistent with a gift list configured on a server. Therefore, some kinds of gift in the gift list may not meet requirements of some regions, and there may also generate conflicts in some regions, therefore, there is no way at all to configure the gift list uniformly by taking into account all the factors.

Figure 1:
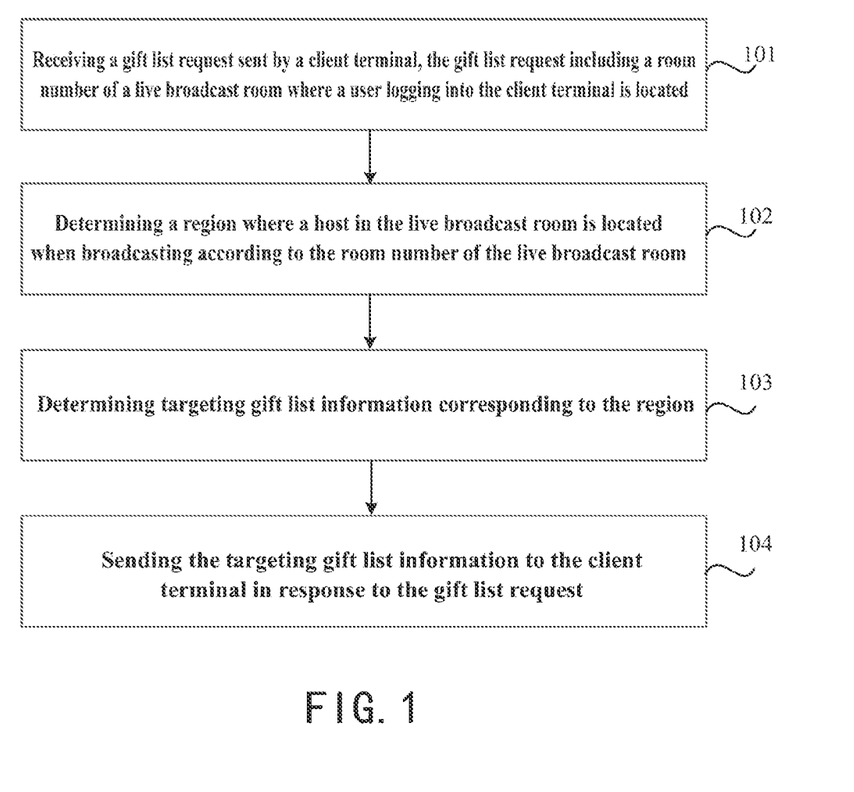
FIG. 1 is a flowchart of a method for configuring a gift list in a live broadcast room illustrated according to an exemplary embodiment of the present disclosure.

FIG. 1 is a flowchart of a method for configuring a gift list in a live broadcast room illustrated according to an exemplary embodiment of the present disclosure. The method is applied to a server. As shown in FIG. 1, the method includes steps 101 to 104.

In step 101, receiving a gift list request sent by a client terminal, the gift list request including a room number of a live broadcast room where a user logging into the client terminal is located. The gift list request is used to request from the server gift list information that can be displayed in a live broadcast room where the client terminal entered. Therefore, the gift list request needs to include the room number of the live broadcast room where a user logging into the client terminal is located.

In step 102, determining a region where a host in the live broadcast room is located when broadcasting according to the room number of the live broadcast room. After the server acquires the room number of the live broadcast room, the server can determine the region where the host in the room number of the live broadcast room is located when broadcasting. Usually, when the host sends a broadcasting request to the server before broadcasting, information about the region where the host is located will be uploaded to the server, so the server can acquire the relationship between the room number of the live broadcast room and the region where the host in the live broadcast room is located when broadcasting in the server locally or in a storage device associated with the server. In addition, the host can also regularly feed back to the server real-time region thereof during broadcasting.

In step 103, determining targeting gift list information corresponding to the region. The correspondence between the targeting gift list information and the region may be preset, for example, a corresponding piece of gift list information may be set for each identifiable region, in this way, once the region is determined, corresponding gift list information can be found according to the region, and the gift list information can be regarded as the targeting gift list information. The targeting gift list information is used to indicate gifts that the client terminal needs to display in the gift list in the live broadcast room, which may include only gift IDs that need to be displayed, or may include all gift IDs and display states corresponding to individual gift IDs. The present disclosure does not have any limitation on specific content of the gift list information, as long as the client terminal can be indicated which gifts should be displayed in the gift list in the live broadcast room where the user logging into the client terminal is located.

In step 104, sending the targeting gift list information to the client terminal in response to the gift list request. After the targeting gift list information is determined, it can be sent to the client terminal that sent the gift list request.

With above technical solution, after receiving a gift list request sent by a client terminal, it is possible to determine, according to room number information of a live broadcast room where a user logging into the client terminal is located, which is included in the request, a broadcast region of a host in the live broadcast room watched by the logged-in user in the client terminal, so that the targeting gift list information to be sent to the client terminal can be determined according to different broadcast region of the host. In this way, different gift lists can be customized for different regions, so that gift lists that can be seen in live broadcast rooms where hosts broadcasting in different regions are located can vary.

Figure 2:
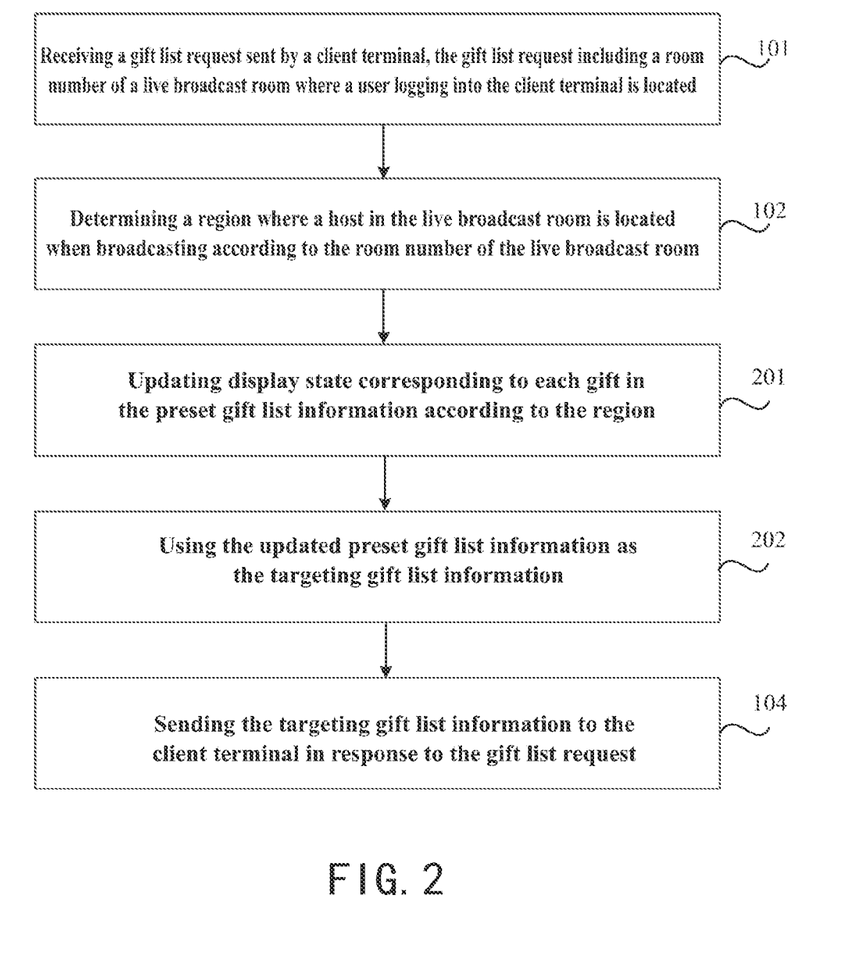
FIG. 2 is a flowchart of a method for configuring a gift list in a live broadcast room illustrated according to another exemplary embodiment of the present disclosure.

FIG. 2 is a flowchart of a method for configuring a gift list in a live broadcast room illustrated according to another exemplary embodiment of the present disclosure. As shown in FIG. 2, the method further includes step 201 and step 202 in addition to step 101, step 102 and step 104 as shown in FIG. 1.

In step 201, updating display state corresponding to each gift in the preset gift list information according to the region.

The preset gift list information may include, for example, information about gifts that can be displayed in all live broadcast rooms. For example, there are currently 20 kinds of gifts that can be displayed by a client terminal, and their gift IDs correspond to 1 to 20 respectively. In the preset gift list information, it can include IDs of the 20 kinds of gifts, and also includes display status corresponding to each gift ID. The display status is used to characterize whether the gift needs to be displayed in the live broadcast room. For example, it can be denoted by a binary field 0/1, which means that when the display status corresponding to any gift ID in the preset gift list information is 1, it denotes that the gift corresponding to the gift ID needs to be displayed in the gift list in the live broadcast room, and when the display status corresponding to any gift ID is 0, it denotes that the gift corresponding to the gift ID will not be displayed in the gift list in the live broadcast room. Wherein, the display state may also be denoted in other ways, and the present disclosure does not have any limitations on the method for denoting the display state.

After the region where the host broadcasting in the live broadcast room where the user logging into the client terminal which sends the gift list is determined, the display state corresponding to each gift in the preset gift list information can be determined according to the region information, and the display state corresponding to each gift in the preset gift list information is updated. Wherein, the method for updating the display state according to the region may be: for example, first acquiring a list of gifts that cannot be displayed according to the region, the gift list including gift IDs that cannot be displayed in the region; and then according to the gift list, modifying the display state of the respective gift in the preset gift list information, for example, if display states corresponding to all gifts in the preset gift list information is to display by default, the display status of gifts that cannot be displayed according to the gift list will be modified to be not display, if display states corresponding to all gifts in the preset gift list information is by default not to display, display states of all gifts except the gifts that cannot be displayed according to the gift list will be modified to be display. In this way, the display state corresponding to each gift in the preset gift list information can be updated according to the region.

In step 202, using the updated preset gift list information as the targeting gift list information. The updated preset gift list information can be sent to the client terminal as the targeting gift list information, to indicate the client terminal to display gifts in the gift list in the live broadcast room.

Figure 3:
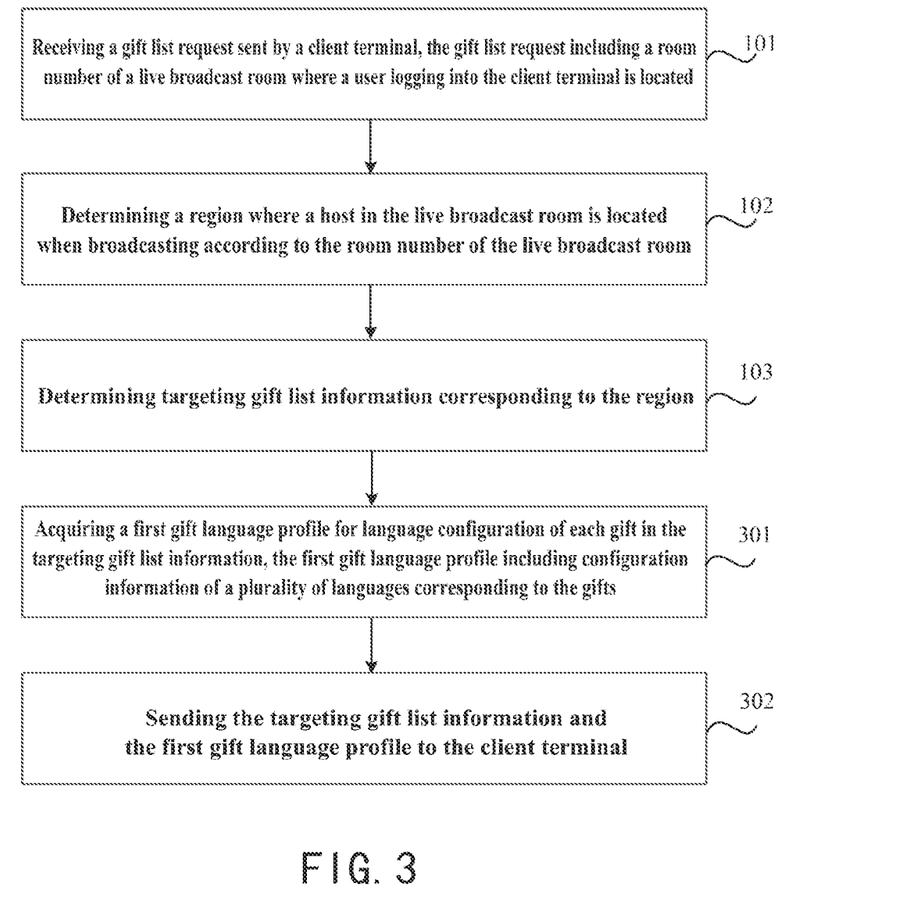
FIG. 3 is a flowchart of a method for configuring a gift list in a live broadcast room illustrated according to another exemplary embodiment of the present disclosure.

FIG. 3 is a flowchart of a method for configuring a gift list in a live broadcast room illustrated according to another exemplary embodiment of the present disclosure. As shown in FIG. 3, the method further includes steps 301 to 302 in addition to steps 101 to 103 as shown in FIG. 1.

In step 301, acquiring a first gift language profile for language configuration of each gift in the targeting gift list information, the first gift language profile including configuration information of a plurality of languages corresponding to the gifts.

In step 302, sending the targeting gift list information and the first gift language profile to the client terminal.

Considering that languages used in different regions may also be different, but the language used by a user watching a live broadcast is not necessarily the same as the language used in the region where the host broadcasting in the live broadcast room watched by the user is located, therefore, after the targeting gift list information is determined, the first gift language profile including the configuration information of a plurality of languages is sent to the client together with the targeting gift list information, so that the client can select appropriate language configuration information from the first gift language profile to perform language configuration of the displayed gifts in the gift list according to its own needs or settings thereof.

Figure 4:
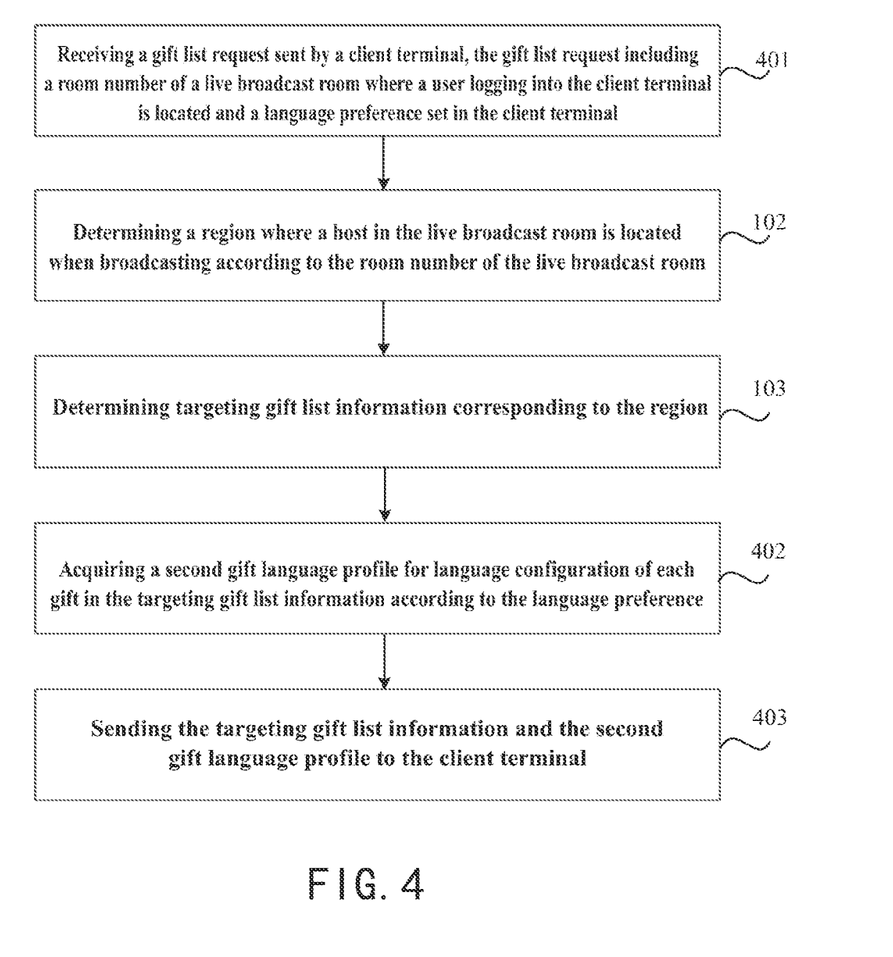
FIG. 4 is a flowchart of a method for configuring a gift list in a live broadcast room illustrated according to another exemplary embodiment of the present disclosure.

FIG. 4 is a flowchart of a method for configuring a gift list in a live broadcast room illustrated according to another exemplary embodiment of the present disclosure. As shown in FIG. 4, the method further includes steps 401 to 403 in addition to steps 102 and 103 as shown in FIG. 1.

In step 401, receiving a gift list request sent by a client terminal, the gift list request including a room number of a live broadcast room where a user logging into the client is located and a language preference set in the client terminal. The language preference is the language selected by the client to be displayed when the user is using the client terminal, and the language preference may be the default language of the client terminal, or may be selected by the user from language setting options in the client terminal. When sending a gift list request to a server, the language preference is included in the gift list request and sent to the server together, so that the server can know the language used by the client terminal.

In step 402, acquiring a second gift language profile for language configuration of each gift in the targeting gift list information according to the language preference. The second gift language profile includes language configuration information capable of configuring each gift in the targeting gift list information with the language preference.

In step 403, sending the targeting gift list information and the second gift language profile to the client terminal.

After acquiring the language preference in the client terminal, the second gift language profile is selected according to the language preference, and the second gift language profile is sent to the client terminal together with the targeting gift list information. In this way, after receiving the second gift language profile and the targeting gift list information, the client terminal can directly configure the language of gifts displayed in the gift list in the live broadcast room according to the second gift profile, without the need to select and configure from the configuration information of the plurality of languages locally on the client terminal.

Figure 5:
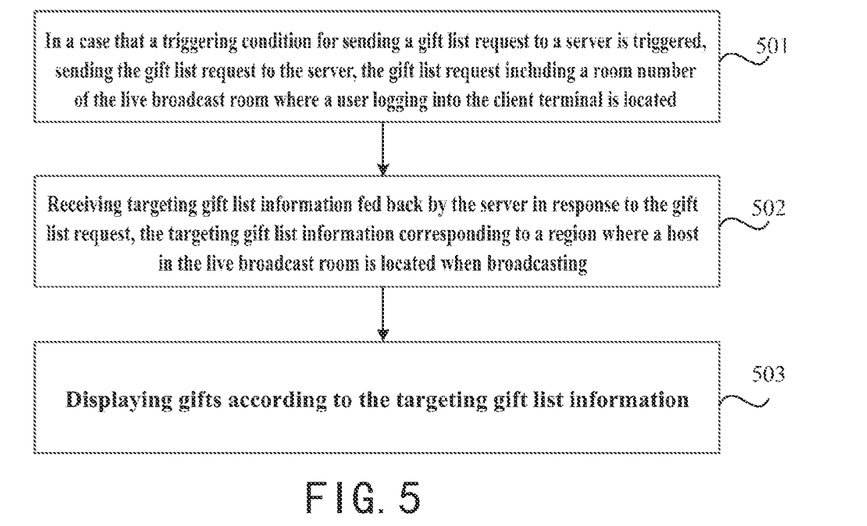
FIG. 5 is a flowchart of a method for configuring a gift list in a live broadcast room illustrated according to an exemplary embodiment of the present disclosure.

FIG. 5 is a flowchart of a method for configuring a gift list in a live broadcast room illustrated according to an exemplary embodiment of the present disclosure. The method is applied to a client terminal. As shown in FIG. 5, the method includes steps 501 to 503.

In step 501, in a case that a triggering condition for sending a gift list request to a server is triggered, sending the gift list request to the server, the gift list request including a room number of the live broadcast room where a user logging into the client terminal is located. The trigger condition can be various trigger conditions, for example, it can be: entering the live broadcast room; that is, when user's operation in the client terminal triggers the trigger condition of "entering the live broadcast room", the client terminal will send the gift list request to the server. The trigger condition can also be, for example: refreshing the live broadcast room; that is, when the user refreshes the broadcast room in the broadcast room, the client terminal will also be triggered to send the gift list request to the server, because the host in the live broadcast room may be moving from one region to another during broadcasting, therefore, when the client terminal user refreshes the live broadcast room, the client terminal can also be triggered to send the gift list request again, so that gifts displayed in the gift list of the live broadcast room in the client terminal can always correspond to the region where the host in the broadcast room is located.

In step 502, receiving targeting gift list information fed back by the server in response to the gift list request, the targeting gift list information corresponding to a region where a host in the live broadcast room is located when broadcasting.

In step 503, displaying gifts according to the targeting gift list information.

After receiving the targeting gift list information, fed back by the server in response to the gift list request, which corresponds to the region where the host in the live broadcast room is broadcasting, the client terminal can display gifts in the gift list in current live broadcast room according to the targeting gift list information.

With above technical solution, after receiving a gift list request sent by a client terminal, it is possible to determine, according to room number information of a live broadcast room where a user logging into the client terminal is located, which is included in the request, a broadcast region of a host in the live broadcast room watched by the logged-in user in the client terminal, so that targeting gift list information to be sent to the client terminal can be determined according to different broadcast region of the host. In this way, different gift lists can be customized for different regions, so that gift lists that can be seen in live broadcast rooms where hosts broadcasting in different regions are located can vary.

In one possible implementation, displaying gifts according to the targeting gift list information includes: displaying gifts according to display state corresponding to each gift in the targeting gift list information. That is, in a case that when indicating which gifts need to be displayed and which gifts do not need to be displayed according to the display state corresponding to each gift in the targeting gift list information, then gifts may be displayed according to the display states.

In another possible implementation, the displaying gifts according to the targeting gift list information includes: displaying gifts according to the gifts shown in the targeting gift list information. That is, in a case that when indicating which gifts need to be displayed and which gifts do not need to be displayed according to gifts shown in the targeting gift list information, gifts are displayed according to the gifts directly shown in the targeting gift list information. Wherein, the gifts shown in the targeting gift list information may be gifts that need to be displayed or gifts that do not need to be displayed, which is not limited in this disclosure, as long as corresponding settings are set on both the client terminal and the server, that is, if, when the server determines gifts shown in the targeting gift list information, it is to include gifts that do not need to be displayed in the targeting gift list information, then, when the client terminal displays gifts according to the targeting gift list information, gifts shown in the targeting gift list information will not be displayed.

Figure 6:
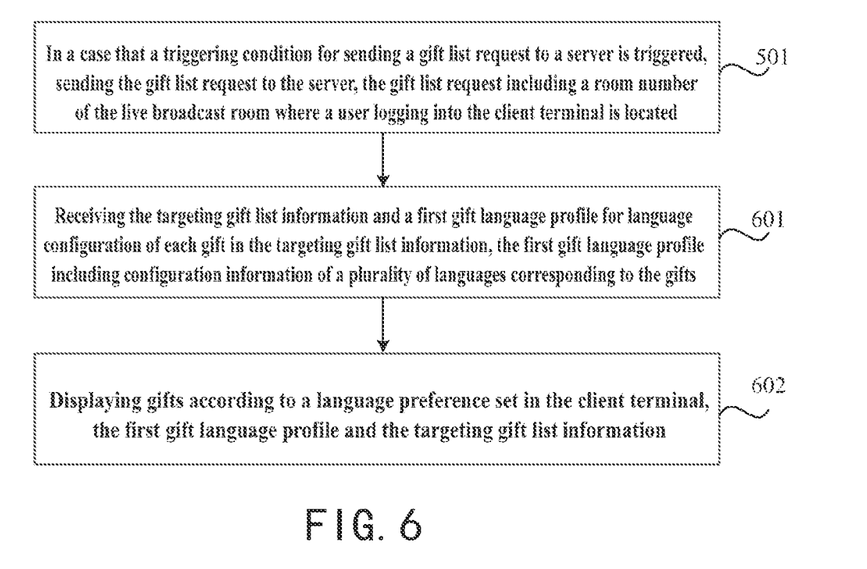
FIG. 6 is a flowchart of a method for configuring a gift list in a live broadcast room illustrated according to another exemplary embodiment of the present disclosure.

FIG. 6 is a flowchart of a method for configuring a gift list in a live broadcast room illustrated according to another exemplary embodiment of the present disclosure. As shown in FIG. 6, the method includes step 601 and step 602 in addition to step 501 as shown in FIG. 5.

In step 601, receiving the targeting gift list information and a first gift language profile for language configuration of each gift in the targeting gift list information, the first gift language profile including configuration information of a plurality of languages corresponding to the gifts.

In step 602, displaying gifts according to a language preference set in the client terminal, the first gift language profile and the targeting gift list information.

After receiving the gift list request, the server cannot only feedback respective targeting gift list information to the client terminal according to the broadcasting region of the host in the live broadcast room where the user logging into the client terminal is located, but also feedback the first gift language profile corresponding to the gifts. After receiving the first gift language profile, the client terminal can select corresponding language configuration information from the first gift language profile according to the language preference set in the current client terminal, so as to realize that the language when displaying gifts in the gift list in the live broadcast room can be the same as the language preference set in the client terminal. In addition, the client terminal can also select respective language configuration information in the first gift language profile according to other settings to configure the language with which gifts are to be displayed, for example, based on user's selection settings, etc. In the present disclosure, there is no limitation on which language configuration information the client terminal will select from the first gift language profile to configure the gifts.

Figure 7:
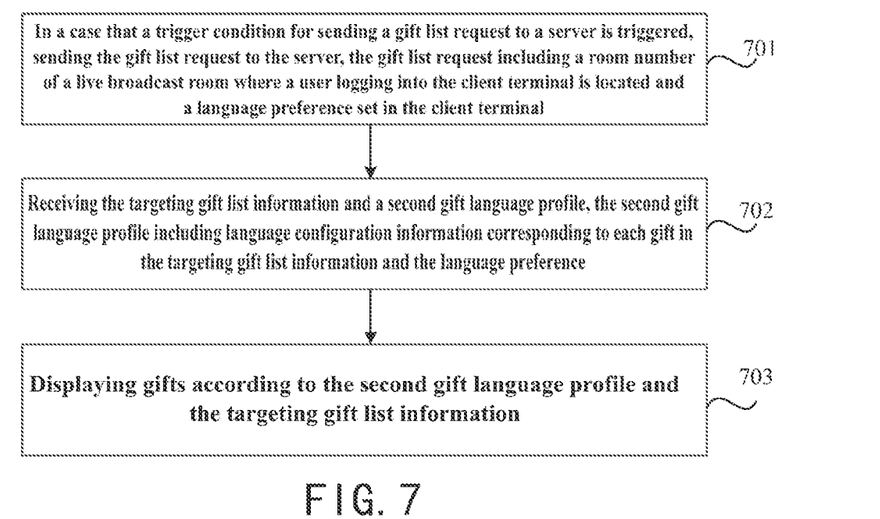
FIG. 7 is a flowchart of a method for configuring a gift list in a live broadcast room illustrated according to another exemplary embodiment of the present disclosure.

FIG. 7 is a flowchart of a method for configuring a gift list in a live broadcast room illustrated according to another exemplary embodiment of the present disclosure. As shown in FIG. 7, the method includes steps 701 to 703.

In step 701, in a case that a trigger condition for sending a gift list request to a server is triggered, sending the gift list request to the server, the gift list request including a room number of a live broadcast room where a user logging into the client terminal is located and a language preference set in the client terminal. When the client terminal is triggered to send the gift list request to the server, the language preference in the client terminal may also be included in the gift list request.

In step 702, receiving the targeting gift list information and a second gift language profile, the second gift language profile including language configuration information corresponding to each gift in the targeting gift list information and the language preference.

In step 703, displaying gifts according to the second gift language profile and the targeting gift list information.

when sending the gift list request to the server, the language preference is also sent to the server, and then respective language configuration can be made to displayed gifts directly according to the second gift language profile fed back by the server. In the second gift language profile, there is the language configuration information corresponding to the language preference for language configuration of the gifts.

Figure 8:
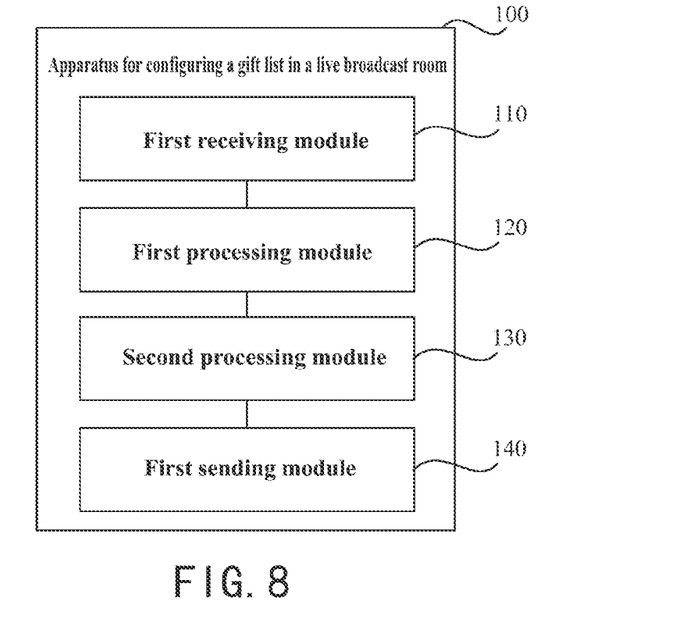
FIG. 8 is a structural block diagram of an apparatus for configuring a gift list in a live broadcast room illustrated according to an exemplary embodiment of the present disclosure.

FIG. 8 is a structural block diagram of an apparatus 100 for configuring a gift list in a live broadcast room illustrated according to an exemplary embodiment of the present disclosure. The apparatus 100 is applied to a server. As shown in FIG. 8, the apparatus 100 includes: a first receiving module 110 used to receive a gift list request sent by a client terminal, the gift list request including a room number of a live broadcast room where a user logging into the client terminal is located; a first processing module 120 used to determine a region where a host in the live broadcast room is located when broadcasting, according to the room number of the live broadcast room; a second processing module 130 used to determine targeting gift list information corresponding to the region; and a first sending module 140 used to send the targeting gift list information to the client terminal in response to the gift list request.

With above technical solution, after receiving a gift list request sent by a client terminal, it is possible to determine, according to room number information of a live broadcast room where a user logging into the client terminal is located, which is included in the request, a broadcast region of a host in the live broadcast room watched by the logged-in user in the client terminal, so that targeting gift list information to be sent to the client terminal can be determined according to different broadcast region of the host. In this way, different gift lists can be customized for different regions, so that gift lists that can be seen in live broadcast rooms where hosts broadcasting in different regions are located can vary.

In one possible implementation, the second processing module 130 includes: a first processing sub-module used to update display state corresponding to each gift in the preset gift list information according to the region; and a second processing sub-module used to take the updated preset gift list information as the targeting gift list information.

In one possible implementation, the apparatus 100 further includes: a first acquiring module used to acquire a first gift language profile for performing language configuration of each gift in the targeting gift list information, the first gift language profile including configuration information of a plurality of languages corresponding to the gifts; the first sending module 140 includes: a first sending sub-module used to send the targeting gift list information and the first gift language profile to the client terminal.

In one possible implementation, the gift list request further includes a language preference set in the client terminal, and the apparatus 100 further includes: a second acquiring module used to acquire, according to the language preference, a second gift language profile for language configuration of each gift in the targeting gift list information; the first sending module 140 includes: a second sending sub-module used to send the targeting gift list information and the second gift language configuration file to the client terminal.

Figure 9:
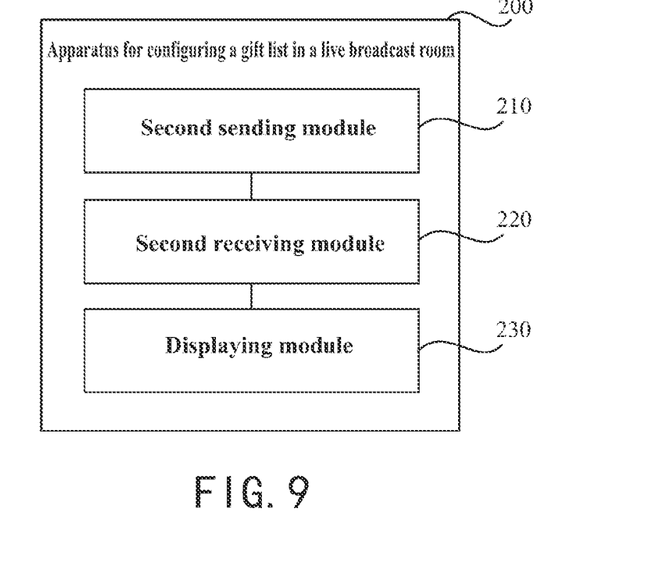
FIG. 9 is a structural block diagram of an apparatus for configuring a gift list in a live broadcast room illustrated according to an exemplary embodiment of the present disclosure.

FIG. 9 is a structural block diagram of an apparatus 200 for configuring a gift list in a live broadcast room illustrated according to an exemplary embodiment of the present disclosure. The apparatus 200 is applied to a client terminal. As shown in FIG. 9, the apparatus 200 includes: a second sending module 210 used to, in a case that a triggering condition for sending a gift list request to a server is triggered, sending the gift list request to the server, the gift list request including a room number of the live broadcast room where a user logging into the client terminal is located; a second receiving module 220 used to receive targeting gift list information fed back by the server in response to the gift list request, the targeting gift list information corresponding to a region where a host in the live broadcast room is located when broadcasting; and a displaying module 230 used to display gifts according to the targeting gift list information.

With above technical solution, after receiving a gift list request sent by a client terminal, it is possible to determine, according to room number information of a live broadcast room where a user logging into the client terminal is located, which is included in the request, a broadcast region of a host in the live broadcast room watched by the logged-in user in the client terminal, so that targeting gift list information to be sent to the client terminal can be determined according to different broadcast region of the host. In this way, different gift lists can be customized for different regions, so that gift lists that can be seen in live broadcast rooms where hosts broadcasting in different regions are located can vary.

In one possible implementation, the displaying module 230 includes: a first display sub-module used to display gifts according to display state corresponding to each gift in the targeting gift list information.

In one possible implementation, the second receiving module 220 includes: a first receiving sub-module used to receive the targeting gift list information and a first gift language profile for language configuration of each gift in the targeting gift list information, the first gift language profile including configuration information of a plurality of languages corresponding to the gifts; and the displaying module 230 further includes: a second display sub-module used to display gifts according to the language preference set in the client terminal, the first gift language profile and the targeting gift list information.

In one possible implementation, the gift list request further includes a language preference set in the client terminal, and the second receiving module 220 includes: a second receiving sub-module used to receive the targeting gift list information and a second gift language profile, the second gift language profile including language configuration information corresponding to each gift in the targeting gift list information and the language preference; the displaying module 230 further includes: a third display sub-modules used to display gifts according to the second gift language profile and the targeting gift list information.

Figure 10:
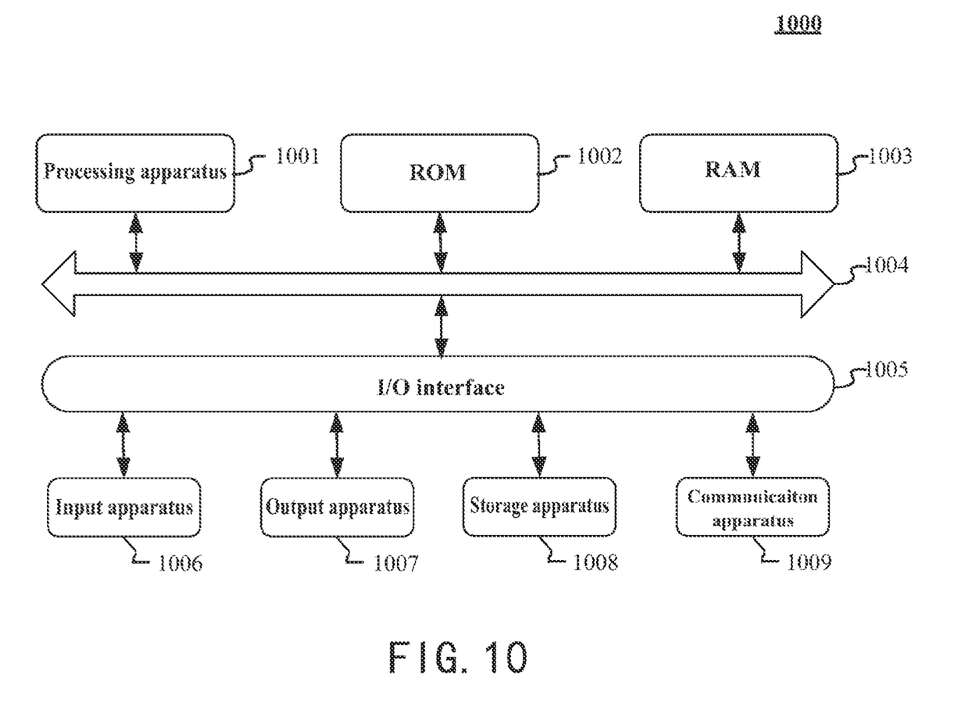
FIG. 10 shows a schematic structural diagram of an electronic device suitable for implementing an embodiment of the present disclosure.

Referring next to FIG. 10, which shows a schematic structural diagram of an electronic device 1000 suitable for implementing embodiments of the present disclosure. The terminal device in the embodiments of the present disclosure may include but not limited to a mobile terminal such as a mobile phone, a notebook, a digital broadcast receiver, a PDA (Personal Digital Assistant), a PAD (tablets), a PMP (Portable Multimedia Player), a vehicle-mounted terminal (such as a car navigation terminal) etc. and a fixed terminal such as a digital TV, a desktop computer, etc. The electronic device shown in FIG. 10 is only one example, and should not bring any limitation to the functions and scope of usages of the embodiments of the present disclosure.

As shown in FIG. 10, the electronic device 1000 may include a processing apparatus (for example a central processing unit, a graphics processor, etc.) 1001, which can execute various appropriate actions and processes according to a program stored in a read-only memory (ROM) 1002 or a program loaded from a storage apparatus 1008 into a random access memory (RAM) 1003. In the RAM 1003, various programs and data required for the operation of the electronic device 1000 are also stored. The processing apparatus 1001, ROM 1002, and RAM 1003 are connected to each other through a bus 1004. An input/output (I/O) interface 1005 is also connected to the bus 1004.

Typically, the following apparatus can be connected to the I/O interface 1005: an input apparatus 1006 including for example, a touch screen, a touch pad, a keyboard, a mouse, a camera, a microphone, an accelerometer, a gyroscope, etc.; an output apparatus 1007 including for example, a liquid crystal display (LCD), a speaker, a vibrator, etc.; a storage apparatus 1008 including for example, a magnetic tape, a hard disk, etc.; and a communication apparatus 1009. The communication apparatus 1009 may allow the electronic device 1000 to perform wireless or wired communication with other devices to exchange data. Although FIG. 10 shows an electronic device 1000 having various apparatus, it should be understood that it is not required to implement or have all of the illustrated apparatus. It can alternatively be implemented or provided with more or fewer apparatus.

In particular, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program code for executing the method shown in the flowchart. In such an embodiment, the computer program may be downloaded and installed from the network through the communication apparatus 1009, or installed from the storage apparatus 1008, or installed from the ROM 1002. When the computer program is executed by the processing apparatus 1001, the above-mentioned functions defined in the methods of the embodiments of the present disclosure are executed.

It should be noted that the above computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some embodiments, the client terminal and server can communicate with any currently known or future developed network protocol such as HTTP (HyperText Transfer Protocol), and can interconnect with digital data communication (for example, communication network) in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The above computer-readable medium may be included in above electronic devices; or it may exist alone without being assembled into the electronic device.

The above computer-readable medium carries one or more programs, which, when executed by the electronic device, cause the electronic device: receiving a gift list request sent by a client terminal, the gift list request including a room number of a live broadcast room where a user logging into the client terminal is located; determining a region where a host in the live broadcast room is located when broadcasting according to the room number of the live broadcast room; determining targeting gift list information corresponding to the region; and sending the targeting gift list information to the client terminal in response to the gift list request.

Alternatively, the above computer-readable medium carries one or more programs, which, when executed by the electronic device, cause the electronic device: in a case that a triggering condition for sending a gift list request to a server is triggered, sending the gift list request to the server, the gift list request including a room number of the live broadcast room where a user logging into the client terminal is located; receiving targeting gift list information fed back by the server in response to the gift list request, the targeting gift list information corresponding to a region where a host in the live broadcast room is located when broadcasting; and displaying gifts according to the targeting gift list information.

The computer program code for performing the operations of the present disclosure can be written in one or more programming languages or a combination thereof. The aforementioned programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The modules involved in the embodiments of the present disclosure may be implemented in software or hardware. Wherein, the name of the module does not constitute a limitation on the module itself under certain circumstances, for example, the first receiving module may also be described as "a module for receiving a gift list request sent by a client".

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, Example 1 provides a method for configuring a gift list in a live broadcast room, which is applied to a server, the method comprising: receiving a gift list request sent by a client terminal, the gift list request including a room number of a live broadcast room where a user logging into the client terminal is located; determining a region where a host in the live broadcast room is located when broadcasting according to the room number of the live broadcast room; determining targeting gift list information corresponding to the region; and sending the targeting gift list information to the client terminal in response to the gift list request.

According to one or more embodiments of the present disclosure, Example 2 provides the method of Example 1, wherein the determining the targeting gift list information corresponding to the region includes: updating display state corresponding to each gift in the preset gift list information according to the region; and using the updated preset gift list information as the targeting gift list information.

According to one or more embodiments of the present disclosure, Example 3 provides the method of Example 1 or Example 2, the method further comprises: acquiring a first gift language profile for language configuration of each gift in the targeting gift list information, the first gift language profile including configuration information of a plurality of languages corresponding to the gifts; the sending the targeting gift list information to the client terminal including: sending the targeting gift list information and the first gift language profile to the client terminal.

According to one or more embodiments of the present disclosure, Example 4 provides the method of Example 1 or Example 2, the gift list request further includes a language preference set in the client terminal, and the method further comprises: acquiring a second gift language profile for language configuration of each gift in the targeting gift list information according to the language preference; the sending the targeting gift list information to the client terminal including: sending the targeting gift list information and the second gift language profile to the client terminal.

According to one or more embodiments of the present disclosure, Example 5 provides a method for configuring a gift list in a live broadcast room, which is applied to a client terminal, the method comprising: in a case that a triggering condition for sending a gift list request to a server is triggered, sending the gift list request to the server, the gift list request including a room number of the live broadcast room where a user logging into the client terminal is located; receiving targeting gift list information fed back by the server in response to the gift list request, the targeting gift list information corresponding to a region where a host in the live broadcast room is located when broadcasting; and displaying gifts according to the targeting gift list information.

According to one or more embodiments of the present disclosure, Example 6 provides the method of Example 5, the displaying gifts according to the targeting gift list information includes: displaying gifts according to display state corresponding to each gift in the targeting gift list information.

According to one or more embodiments of the present disclosure, Example 7 provides the method of Example 5 or Example 6, the receiving the targeting gift list information fed back by the server in response to the gift list request includes: receiving the targeting gift list information and a first gift language profile for language configuration of each gift in the targeting gift list information, the first gift language profile including configuration information of a plurality of languages corresponding to the gifts; the displaying gifts according to the targeting gift list information including: displaying gifts according to a language preference set in the client terminal, the first gift language profile and the targeting gift list information.

According to one or more embodiments of the present disclosure, Example 8 provides the method of Example 5 or Example 6, the gift list request further includes a language preference set in the client terminal, and the receiving the targeting gift list information fed back by the server in response to the gift list request includes: receiving the targeting gift list information and a second gift language profile, the second gift language profile including language configuration information corresponding to each gift in the targeting gift list information and the language preference; and displaying gifts according to the second gift language profile and the targeting gift list information.

According to one or more embodiments of the present disclosure, Example 9 provides an apparatus for configuring a gift list in a live broadcast room, which is applied to a server, the apparatus comprising: a first receiving module used to receive a gift list request sent by a client terminal, the gift list request including a room number of a live broadcast room where a user logging into the client terminal is located; a first processing module used to determine a region where a host in the live broadcast room is located when broadcasting, according to the room number of the live broadcast room; a second processing module used to determine targeting gift list information corresponding to the region; and a first sending module used to send the targeting gift list information to the client terminal in response to the gift list request.

According to one or more embodiments of the present disclosure, Example 10 provides an apparatus for configuring a gift list in a live broadcast room, which is applied to a client terminal, the apparatus comprising: a second sending module used to, in a case that a triggering condition for sending a gift list request to a server is triggered, sending the gift list request to the server, the gift list request including a room number of the live broadcast room where a user logging into the client terminal is located; a second receiving module used to receive targeting gift list information fed back by the server in response to the gift list request, the targeting gift list information corresponding to a region where a host in the live broadcast room is located when broadcasting; and a displaying module used to display gifts according to the targeting gift list information.

According to one or more embodiments of the present disclosure, Example 11 provides a computer-readable medium having a computer program stored thereon, which, when executed by a processing apparatus, implements the steps of the method in any of Examples 1-4.

According to one or more embodiments of the present disclosure, Example 12 provides an electronic device, comprising: a storage apparatus having a computer program stored thereon; and a processing apparatus used to execute the computer program in the storage apparatus to implement the steps of the method in any of Examples 1-4.

According to one or more embodiments of the present disclosure, Example 13 provides a computer-readable medium having a computer program stored thereon, which, when executed by a processing apparatus, implements the steps of the method in any of Examples 5-8.

According to one or more embodiments of the present disclosure, Example 14 provides an electronic device, comprising: a storage apparatus having a computer program stored thereon; and a processing apparatus used to execute the computer program in the storage apparatus to implement the steps of the method in any of Examples 5-8.

The above description is only preferred embodiments of the present disclosure and an explanation to the technical principles applied. Those skilled in the art should understand that the scope of disclosure involved in this disclosure is not limited to technical solutions formed by specific combination of above technical features, and should also cover other technical solutions formed by arbitrarily combining above technical features or equivalent features thereof without departing from above disclosed concept. For example, those technical solutions formed by exchanging of above features and technical features disclosed in the present disclosure (but not limited to) having similar functions with each other.

In addition, although various operations are depicted in a specific order, this should not be understood as requiring these operations to be performed in the specific order shown or performed in a sequential order. Under certain circumstances, multitasking and parallel processing may be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in a language specific to structural features and/or logical actions of the method, it should be understood that the subject matter defined in the appended claims is not necessarily limited to the specific features or actions described above. Rather, the specific features and actions described above are merely exemplary forms of implementing the claims. Regarding to the apparatus in above embodiments, specific implementation in which individual modules perform operations has been described in detail in these method embodiments, and thus will not be described in detail here.

What is claimed is:

1. A method for configuring a gift list in a live stream channel applied to a server, the method comprising:

receiving a gift list request sent by a client terminal, the gift list request including a channel identification of a live stream channel where a user logging into the client terminal is located;

determining a region where a host in the live stream channel is located when broadcasting according to the channel identification of the live stream channel;

determining targeting gift list information corresponding to the region; and sending the targeting gift list information to the client terminal in response to the gift list request.

2. The method according to claim 1, wherein the determining the targeting gift list information corresponding to the region includes:

updating display state corresponding to each gift in the preset gift list information according to the region; and using the updated preset gift list information as the targeting gift list information.

3. The method according to claim 1, wherein the method further comprises:

acquiring a first gift language profile for language configuration of each gift in the targeting gift list information, the first gift language profile including configuration information of a plurality of languages corresponding to the gifts;

the sending the targeting gift list information to the client terminal including:

sending the targeting gift list information and the first gift language profile to the client terminal.

4. The method according to claim 1, wherein the gift list request further includes a target language set in the client terminal, and the method further comprises:

acquiring a second gift language profile for language configuration of each gift in the targeting gift list information according to the target language;

the sending the targeting gift list information to the client terminal including:

sending the targeting gift list information and the second gift language profile to the client terminal.

5. A method for configuring a gift list in a live stream channel applied to a client terminal, the method comprising:

in a case that a triggering condition for sending a gift list request to a server is triggered, sending the gift list request to the server, the gift list request including a channel identification of the live stream channel where a user logging into the client terminal is located;

receiving targeting gift list information fed back by the server in response to the gift list request, the targeting gift list information corresponding to a region where a host in the live stream channel is located when broadcasting; and displaying gifts according to the targeting gift list information.

6. The method according to claim 5, wherein the displaying gifts according to the targeting gift list information includes:

displaying gifts according to display state corresponding to each gift in the targeting gift list information.

7. The method according to claim 5, wherein the displaying gifts according to the targeting gift list information includes:

displaying gifts according to the gifts shown in the targeting gift list information.

8. The method according to claim 5, wherein the receiving the targeting gift list information fed back by the server in response to the gift list request includes:

receiving the targeting gift list information and a first gift language profile for language configuration of each gift in the targeting gift list information, the first gift language profile including configuration information of a plurality of languages corresponding to the gifts;

the displaying gifts according to the targeting gift list information further including:

displaying gifts according to a target language set in the client terminal, the first gift language profile and the targeting gift list information.

9. The method according to claim 5, wherein the gift list request further includes a target language set in the client terminal, and the receiving the targeting gift list information fed back by the server in response to the gift list request includes: receiving the targeting gift list information and a second gift language profile, the second gift language profile including language configuration information corresponding to each gift in the targeting gift list information and the target language;

the displaying gifts according to the targeting gift list information further including:

displaying gifts according to the second ta profile and the targeting gift list information.

10. An apparatus for configuring a gift list in a live stream channel applied to a server, the apparatus comprising:

a first receiving module configured to receive a gift list request sent by a client terminal, the gift list request including a channel identification of a live stream channel where a user logging into the client terminal is located;

a first processing module configured to determine a region where a host in the live stream channel is located when broadcasting, according to the channel identification of the live stream channel;

a second processing module configured to determine targeting gift list information corresponding to the region; and a first sending module configured to send the targeting gift list information to the client terminal in response to the gift list request.

11. An apparatus for configuring a gift list in a live stream channel applied to a client terminal, the apparatus comprising:

a second sending module configured to, in a case that a triggering condition for sending a gift list request to a server is triggered, sending the gift list request to the server, the gift list request including a channel identification of the live stream channel where a user logging into the client terminal is located;

a second receiving module configured to receive targeting gift list information fed back by the server in response to the gift list request, the targeting gift list information corresponding to a region where a host in the live stream channel is located when broadcasting; and a displaying module configured to display gifts according to the targeting gift list information.

12. A non-transitory computer-readable storage medium having a computer program stored thereon when the program is executed by a processing apparatus, implements the steps of the method according to claim 1.

13. An electronic device, comprises:

a storage apparatus having a computer program stored thereon; and a processing apparatus used to execute the computer program in the storage apparatus to implement the steps of the method according to claim 1.

14. A non-transitory computer-readable storage medium having a computer program stored thereon, when the program is executed by a processing apparatus, implements the steps of the method according to claim 5.

15. An electronic device, comprises:
   a storage apparatus having a computer program stored thereon; and
   a processing apparatus configured to execute the computer program in the storage apparatus to implement the steps of the method according to claim 5.

* * * * *